US012127999B2

(12) United States Patent
Härdig et al.

(10) Patent No.: US 12,127,999 B2
(45) Date of Patent: Oct. 29, 2024

(54) MECHANICAL CPR WITH SELECTIVE ZERO-POSITION AND COMPRESSION DEPTH ADJUSTMENT

(71) Applicant: JOLIFE AB, Lund (SE)

(72) Inventors: Bjarne Madsen Härdig, Lund (SE); Karl Fredrik Mauritz Arnwald, Lund (SE); Anders Nilsson, Åkarp (SE); Erik Von Schenck, Lomma (SE); Sara Lindroth, Lund (SE)

(73) Assignee: JOLIFE AB, Lund (SE)

( * ) Notice: Subject to any disclaimer, the term of this patent is extended or adjusted under 35 U.S.C. 154(b) by 1204 days.

(21) Appl. No.: 16/321,366

(22) PCT Filed: Jul. 28, 2017

(86) PCT No.: PCT/EP2017/069119
§ 371 (c)(1),
(2) Date: Jan. 28, 2019

(87) PCT Pub. No.: WO2018/024619
PCT Pub. Date: Feb. 8, 2018

(65) Prior Publication Data

US 2019/0175443 A1 Jun. 13, 2019

Related U.S. Application Data

(60) Provisional application No. 62/378,651, filed on Aug. 23, 2016, provisional application No. 62/370,654, filed on Aug. 3, 2016.

(51) Int. Cl.
*A61H 31/00* (2006.01)

(52) U.S. Cl.
CPC ......... *A61H 31/005* (2013.01); *A61H 31/006* (2013.01); *A61H 2031/001* (2013.01);
(Continued)

(58) Field of Classification Search
CPC .... A61H 31/00; A61H 31/004; A61H 31/005; A61H 31/006; A61H 31/008
See application file for complete search history.

(56) References Cited

U.S. PATENT DOCUMENTS 261,394 A 7/1882 Slater
2,036,248 A 4/1936 Acklen
(Continued)

FOREIGN PATENT DOCUMENTS

EP 1997469 A1 * 12/2008 ........... A61H 31/005
WO WO-2010004499 A1 * 1/2010 ........... A61H 31/004
(Continued)

OTHER PUBLICATIONS

English translation of Kandori et al. (EP 2647365 A1) (Year: 2013).*
(Continued)

*Primary Examiner* — Justine R Yu
*Assistant Examiner* — Christopher E Miller
(74) *Attorney, Agent, or Firm* — Miller Nash LLP

(57) ABSTRACT

The disclosed CPR devices, systems, and methods adjust a compression depth of a compression mechanism to account for chest collapse of the patient receiving CPR. Compression depth can be adjusted up to a maximum depth in some examples. The compression depth can also be adjusted linearly or non-linearly as the zero point or starting position of the patient's chest changes due to chest collapse. Other factors can also be used to adjust the compression depth such as patient parameters that can be observed by a rescuer or sensed by sensors wirelessly connected to or integrated into the system. CPR devices that include active decompression can also use the disclosed techniques for adjusting the chest compression depth as the patient's chest collapses.

20 Claims, 8 Drawing Sheets

(52) U.S. Cl.
CPC ................ *A61H 2201/5061* (2013.01); *A61H 2201/5071* (2013.01); *A61H 2230/045* (2013.01); *A61H 2230/085* (2013.01); *A61H 2230/206* (2013.01); *A61H 2230/208* (2013.01); *A61H 2230/255* (2013.01); *A61H 2230/305* (2013.01)

(56) References Cited

U.S. PATENT DOCUMENTS 5,261,394 A 11/1993 Mulligan et al.
5,490,820 A 2/1996 Schock et al.
5,645,522 A 7/1997 Lurie et al.
6,587,726 B2 7/2003 Lurie et al.
7,008,388 B2 3/2006 Sherman et al.
7,308,304 B2 12/2007 Hampton et al.
7,569,021 B2 8/2009 Sebelius et al.
7,747,319 B2 6/2010 Freeman
7,841,996 B2 11/2010 Sebelius et al.
8,007,451 B2 8/2011 Håvardsholm et al.
8,147,434 B2 4/2012 Mollenauer et al.
8,366,645 B1 2/2013 Belalcazar
10,292,899 B2 5/2019 Nilsson et al.
2002/0177793 A1 11/2002 Sherman et al.
2004/0030272 A1 2/2004 Kelly et al.
2004/0058305 A1 3/2004 Lurie et al.
2004/0082888 A1* 4/2004 Palazzolo ............ A61B 5/7242 601/41
2004/0230140 A1 11/2004 Steen
2006/0089574 A1 4/2006 Paradis
2006/0094991 A1 5/2006 Walker
2007/0093731 A1 4/2007 Warwick et al.
2008/0146974 A1* 6/2008 Lund .................... A61H 31/005 601/41
2009/0062701 A1 3/2009 Yannopoulos et al.
2010/0004571 A1* 1/2010 Nilsson ................ A61H 31/006 601/41
2010/0185127 A1* 7/2010 Nilsson .................. A61H 31/00 601/41
2010/0198117 A1* 8/2010 Itnati .................... A61H 31/006 601/41
2010/0198118 A1* 8/2010 Itnati .................... A61H 31/004 601/41
2010/0312153 A1 12/2010 McIntyre et al.
2011/0092864 A1* 4/2011 Woerlee ................. A61H 31/00 601/41
2012/0016179 A1 1/2012 Paradis et al.
2012/0016279 A1 1/2012 Banville et al.
2012/0203147 A1 8/2012 Lurie et al.
2012/0226204 A1* 9/2012 Coleman .............. A61B 5/6843 601/41
2012/0259156 A1 10/2012 Freeman
2012/0330199 A1 12/2012 Lurie et al.
2012/0330200 A1 12/2012 Voss et al.
2013/0053649 A1 2/2013 Elghazzawi et al.
2013/0079684 A1 3/2013 Rosen et al.
2013/0218056 A1* 8/2013 Aelen .................... A61H 31/00 601/41
2013/0282069 A1 10/2013 Thiagarajan et al.
2013/0324894 A1* 12/2013 Herken .................. A61H 31/00 601/41
2014/0066822 A1* 3/2014 Freeman .............. A61H 31/006 601/41
2014/0066824 A1 3/2014 Johnson
2014/0088467 A1 3/2014 Parascandola et al.
2014/0094724 A1 4/2014 Freeman
2014/0135666 A1* 5/2014 Butler .................. A61H 31/005 601/41
2014/0155792 A1 6/2014 Karve et al.
2014/0171840 A1* 6/2014 Aelen .................. A61H 31/005 601/41
2014/0180180 A1* 6/2014 Nilsson ................ A61H 31/006 601/41
2014/0221882 A1 8/2014 Jeppsson
2014/0276269 A1 9/2014 Illindala
2015/0094617 A1* 4/2015 Aelen .................... A61B 5/107 600/587
2015/0119768 A1* 4/2015 Meier .................. A61H 31/008 601/41
2015/0257971 A1* 9/2015 Chapman ............... A61H 31/00 601/41
2015/0272822 A1 10/2015 Wik et al.
2015/0328083 A1* 11/2015 Delisle ................. A61H 31/008 601/43
2016/0136042 A1* 5/2016 Nilsson ................ A61H 31/004 601/41
2016/0143804 A1* 5/2016 Nilsson ................ A61H 31/006 601/41
2016/0296419 A1* 10/2016 Paulussen ............ A61H 31/006
2016/0317385 A1* 11/2016 Salcido ................ A61H 31/006
2017/0156977 A1* 6/2017 Walden ................ A61H 31/006

FOREIGN PATENT DOCUMENTS

WO 2012/063163 A1 5/2012
WO 2014051934 A1 4/2014
WO 2016/081381 A1 5/2016

OTHER PUBLICATIONS

International Search Report and Written Opinion issued in PCT/EP2017/069119 on Oct. 20, 2017. 14 pages.
Extended European Search Report issued in European Patent Application No. 21204622.1, mailed Jan. 25, 2022, 4 pages.

* cited by examiner

COMPONENTS OF CPR MACHINE

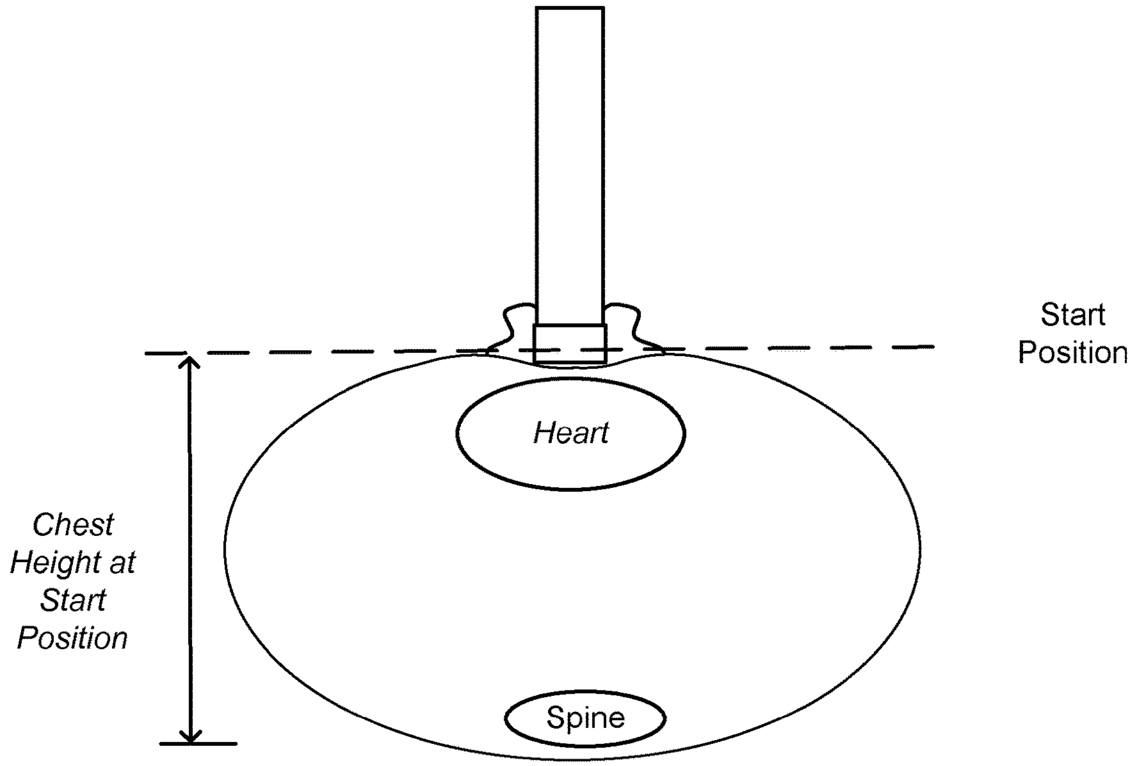
FIG. 9
FIG. 10
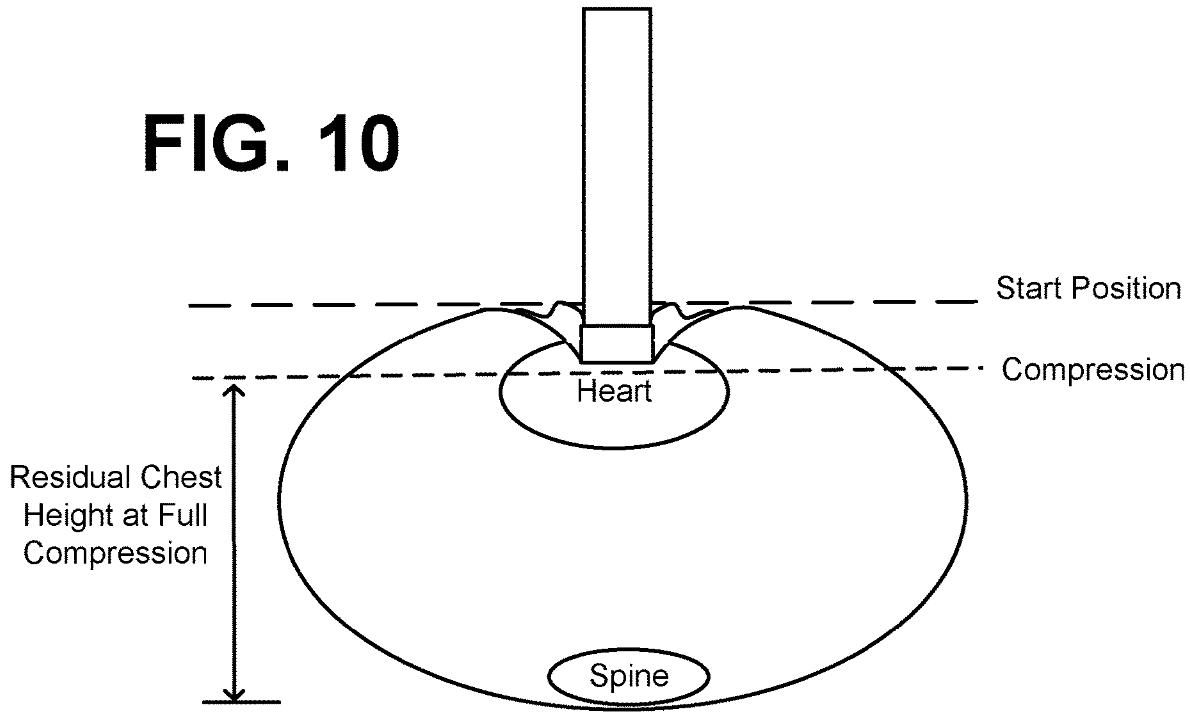

MECHANICAL CPR WITH SELECTIVE ZERO-POSITION AND COMPRESSION DEPTH ADJUSTMENT

CROSS-REFERENCE TO RELATED APPLICATIONS

This application is a national stage filing under 35 U.S.C. § of International Application No. PCT/EP2017/069119, filed Jul. 28, 2017, which claims priority to U.S. Provisional Application No. 62/370,654, filed Aug. 3, 2016, and U.S. Provisional Application No. 62/378,651, filed Aug. 23, 2016, both of which are incorporated herein in their entirety for all purposes. This application is also related to International Application No. PCT/US2015/060926, filed Nov. 16, 2015; U.S. application Ser. No. 14/616,056, filed Feb. 2, 2015; and U.S. Provisional Application No. 62/080,969, filed Nov. 17, 2014, each of which are incorporated herein by reference in their entirety for all purposes.

BACKGROUND

In certain types of medical emergencies, a patient's heart stops working, which stops the blood from flowing. Without the blood flowing, organs like the brain will start being damaged, and the patient will soon die. Cardiopulmonary Resuscitation (CPR) can forestall these risks. CPR includes performing repeated chest compressions to the chest of the patient, so as to cause the patient's blood to circulate. CPR also includes delivering rescue breaths to the patient, so as to create gas exchange in the lungs. CPR is intended to maintain circulation to the patient until a more definite therapy is made available, such as defibrillation or other therapeutic interventions to reverse the underlying cause of the cardiac arrest. Defibrillation is an electrical shock deliberately delivered to a person in the hope of restoring their heart rhythm.

To ensure that CPR circulate blood effectively, guidelines by medical experts such as the American Heart Association provide parameters for the chest compressions. The parameters include the frequency, the depth reached, fully releasing after a compression, and so on. Currently, the recommended depth is to exceed 5 cm (2 in.). The parameters also include instructions for the rescue breaths.

Traditionally, CPR has been performed manually. A number of people have been trained in CPR, including some who are not in the medical professions, just in case they are bystanders in an emergency event. Manual CPR might be ineffective and the rescuer might not be able to recall their training, especially under the stress of the moment. And even the best trained rescuer become fatigued from performing the chest compressions for a long time, at which point their performance might be degraded. In the end, chest compressions that are not frequent enough, not deep enough, or not followed by a full release may fail to maintain the blood circulation required to forestall organ damage and death.

The risk of ineffective chest compressions has been addressed with chest compression devices. Such machines have been known by a number of names, for example chest compression machines, CPR devices, mechanical CPR devices, cardiac compressors and so on.

Chest compression devices are used with the patient in supine position, which means lying on his or her back. Such machines then repeatedly compress and release the chest of the patient. In fact, they can be programmed so that they will automatically compress and release at the recommended rate or frequency, and can reach a specific depth within the range recommended by the guidelines.

The repeated chest compressions of CPR are actually compressions alternating with releases. The compressions cause the chest to be compressed from its original shape. During the releases the chest is decompressing, which means that the chest is undergoing the process of returning to its original shape. This process starts immediate upon release, but it might return to its original position before the time the next compression starts. In addition, the chest may start collapsing due to the repeated compressions, which means that it does not fully return to its original height after compressions are administered for some time. Conversely, if the patient is not suffering from chest collapse, the patient's chest returns to its resting height from before the chest compression was administered.

Some chest compression devices compress the chest by a piston or a band. Some may even have a suction cup at the end of the piston, with which they lift the chest during the releases. This lifting may actively assist the decompression of the chest faster than the chest would accomplish by itself and by this improve venous return and improve circulation. This type of lifting is sometimes called active decompression.

Active decompression may also improve air circulation in the patient, which is a component of CPR. The improved air circulation may be especially critical, given that the chest could be collapsing due to the repeated compressions, and would thus be unable by itself to intake the necessary air.

SUMMARY

The present description gives examples of CPR devices, software, and methods that may help overcome problems and limitations of the prior art.

An example CPR device includes a chest compression mechanism and a processor. The chest compression mechanism is structured to administer chest compressions to the chest of a patient. Each of the chest compressions have a compression depth and the chest of the patient has a resting chest height. The processor is configured to determine a present zero-position and a maximum or minimum zero-position of the CPR device for one or more of the chest compressions. The processor is also configured to determine one or both of a maximum or minimum chest compression depth or a maximum change in zero-position for the CPR device. The processor also receives one or more of rescuer input on chest collapse, one or more patient parameters indicative of chest collapse, or device derived chest collapse data indicative of a change in the resting chest height of the patient over multiple chest compressions and generates chest collapse data based on the received input. In response to the generated chest collapse data, the processor generates instructions to adjust or retain the zero-position of the CPR device based on the chest collapse data up to the maximum or minimum zero-position for the CPR device and adjusts a compression depth for the chest compressions based on the chest collapse data up to the maximum or minimum chest compression depth.

In another embodiment, the CPR device has a similar chest compression mechanism to the one described in the previous embodiment and a similar processor. However, the processor in this embodiment determines a present zero-position of the CPR device for at least one of the chest compressions to be administered to the chest of the patient and determines an initial chest compression depth of the chest compression mechanism. It also receives one or more of rescuer input on chest collapse, patient parameter data indicative of chest collapse, or device derived chest collapse data indicative of a change in the resting chest height of the patient over multiple administered chest compressions and generates chest collapse data based on the received input. In response to the generated chest collapse data, the processor generates instructions to adjust or retain the zero-position of the CPR device based on the chest collapse data and to adjust or retain a compression depth for the chest compressions based on the chest collapse data. The processor also generates instructions to adjust or retain chest compression depth to the chest of the patient based on the adjusted or retained zero-position and the adjusted or retained compression depth of the CPR device.

In yet another embodiment, the CPR device again has a similar chest compression mechanism to the previous examples and a processor. This processor is configured to determine a first zero-position of the CPR device for at least one of the chest compressions to be administered to the chest of the patient and determine a first chest compression depth of the chest compression mechanism. The processor is also configured to detect a change in the resting chest height. In response to the detected change in resting chest height while administering chest compressions to the chest of the patient, the processor is also configured to automatically adjust or retain the zero-position of the CPR device and administer and adjust or retain chest compressions to the chest of the patient based on the adjusted zero-position.

BRIEF DESCRIPTION OF THE DRAWINGS

Non-limiting and non-exhaustive embodiments of the invention are described with reference to the following drawings. In the drawings, like reference numerals refer to like parts throughout the various figures, unless otherwise specified.

FIG. 9 shows a cross-section of the patient's torso shown in FIG. 3 with a chest compression mechanism in position to apply chest compressions.

FIG. 10 shows a cross-section of the patient's torso shown in FIG. 3 with the chest compression mechanism applying a chest compression.

DETAILED DESCRIPTION

The subject matter of embodiments disclosed herein is described with specificity to meet statutory requirements, but this description does not intend to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Embodiments will be described more fully hereinafter with reference to the accompanying drawings, which form a part hereof, and which show, by way of illustration, exemplary embodiments by which the systems, devices, and methods described may be practiced.

The disclosed cardio-pulmonary resuscitation ("CPR") chest compression devices, machines, systems, methods, and software perform CPR chest compressions on a patient. Embodiments are now described in more detail.

Figure 1:
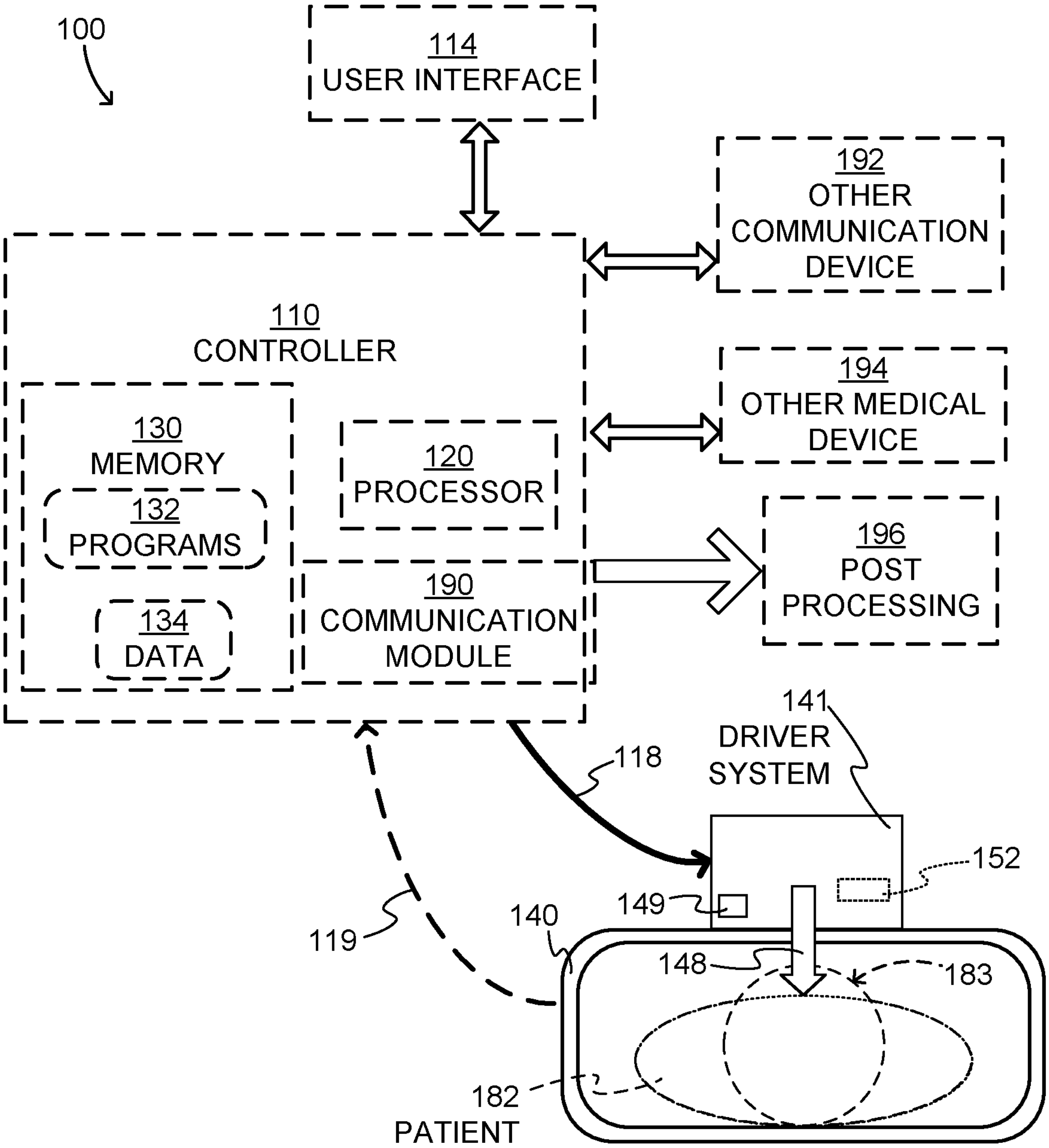
FIG. 1 is a diagram of components of an abstracted example CPR device.

FIG. 1 shows a diagram of components 100 of an abstracted CPR device according to example embodiments. The abstracted CPR device can be configured to perform compressions on a chest of a supine patient 182. The components 100 include a back plate 139. In FIG. 1, an abstracted version of a patient 182 placed supine on the back plate 139. A midpoint 138 of the back plate 139 is also shown. An elevation axis 137 starts from midpoint 138 and can be used for determining a resting height of the chest of the patient. The resting chest height can determine the zero-position of the CPR device. The zero-position of the CPR device is the position from which the chest compression mechanism of the CPR device administers chest compressions to the patient.

The chest compression mechanism 148 is shown as the arrow indicating motion towards the anterior surface of the patient's chest and can be a piston or plunger style compression mechanism, one or more rigid arms, or a belt or strap that tightens and releases to apply chest compressions. Any suitable chest compression mechanism that can apply a proper CPR chest compression can be used and following the teachings of the present disclosure those skilled in the art will appreciate that alternative options may be substituted or added to the chest compression mechanisms described herein.

The back plate 139 can be part of a retention structure. An abstracted retention structure 140 of a CPR chest compression device is shown in FIG. 1. The patient 182 is placed supine within the retention structure 140. The retention structure 140 retains the body of the patient 182 on the back plate 139. While the retention structure 140 typically reaches the chest and the back of patient 182, it does not reach the patient's head 183.

The retention structure 140 may be implemented in a number of ways. Examples embodiments are disclosed in U.S. Pat. No. 7,569,021, which is incorporated by reference in its entirety; such retention mechanism available from Physio-Control, Inc. in Redmond, Washington under the trademark LUCAS®. In other embodiments, the retention structure 140 includes a backboard, of which the back plate 139 is a part, and a belt that can be placed around the patient's chest to apply the chest compressions.

The components 100 of the CPR device also include a compression mechanism 148. The compression mechanism 148 can be configured to perform the compressions to the patient's chest. The chest compression mechanism 148 administers a chest compression by applying a compression force through activation of the mechanism—a piston, plunger, one or more rigid arms, belt, strap, or the like—towards a target organ, which is typically the patient's heart in CPR. When the compression mechanism is released, the patient's chest naturally decompresses, which means it returns to all or some portion of its previous chest height before the chest compression began. Alternatively, the CPR device can include techniques and attachments that can actively apply a decompression force to the patient's chest to aid in returning it as close as possible to its chest height before the chest compression began or to a target chest height. Active decompression is the application of decompression force to aid the patient's chest to decompress. Active decompression attachments can include a suction cup, an adhesive surface, or some combination of elements that secures the compression mechanism to the patient's chest to be able to apply the decompression force.

Returning again to FIG. 1, the components 100 can also include a driver system 141. The driver system 141 can be configured to automatically drive compression mechanism 148 according to a compression profile or any set of instructions relating to compressions and active decompressions, if the CPR device includes active decompression capabilities. The compression profile can be a standard or default profile or could be customized in any number of ways, as described below by way of examples. The driving mechanism may cause the compressions to be performed repeatedly in some examples.

The compression mechanism 148 and driver system 141 may be implemented in combination with the retention structure 140 in a number of ways. In the above mentioned example of U.S. Pat. No. 7,569,021 the compression mechanism 148 includes a piston, and the driver system 141 includes a rack-and-pinion mechanism. The piston is also called a plunger. In embodiments where the retention structure 140 includes a belt, the compression mechanism 148 may include a spool for collecting and releasing the belt so as to correspondingly squeeze and release the patient's chest, and the driver system 141 can include a motor for driving the spool with respect to the back plate.

The components 100 may further include a controller 110. The driver system 141 may be controlled by a controller 110 in some examples, such as by the compression profile discussed above. The compression profile is a set of instructions for the manner in which the chest compressions are to be administered to the patient's chest, including information like the compression depth of the chest compressions to be applied by the chest compression mechanism. The compression depth can be measured by the chest compression mechanism stroke, for example, which is the distance traveled by the chest compression mechanism from its zero-position. One embodiment has a piston-style chest compression mechanism and the compression depth is measured as the piston amplitude that it travels during a chest compression. Another way to measure compression depth is the distance that the patient's chest moves during a compression. For example, the compression depth can be measured as a difference in the patient's initial chest height compared to the patient's residual chest height at a full compression, either internally or externally of the patient's torso, depending on the devices. Either measurement for chest compression can be used in the example CPR devices disclosed herein. Those skilled in the art will appreciate that additional techniques for measuring chest compression depth can also be used either alternatively or in addition to the two examples previously described.

The controller 110 may include a processor 120 that can be implemented in a number of ways, such as with a microprocessor, Application Specific Integration Circuits (ASICs), programmable logic circuits, general processors, etc. While a specific use is described for the processor 120, it will be understood that processor 120 can either be standalone for this specific use, or also perform other acts, operations or process steps. In some examples, the controller 110 is integrated into the chest compression mechanism 148 and in other examples, the controller is wirelessly coupled to the chest compression mechanism 148 to drive it.

The controller 110 can additionally include a memory 130 coupled with the processor 120. The memory 130 can be implemented by one or more memory chips. The memory 130 can be a non-transitory storage medium that stores programs 132, which contain instructions for machines. The programs 132 can be configured as a set of instructions to be read and generated by the processor 120, and to be executed upon reading. The processor executes the instructions by physically manipulating physical quantities, and may result in functions, processes, actions, operations and/or methods to be performed, and/or the processor 120 can cause other devices or components to perform such functions, processes, actions, operations and/or methods. Often, for the sake of convenience only, it is preferred to implement and describe a program as various interconnected distinct software modules or features, individually and collectively also known as software. This is not necessary, however, and there may be cases where modules are equivalently aggregated into a single program. In some instances, software is combined with hardware in a mix called firmware.

While one or more specific uses are described for the memory 130, it will be understood that the memory 130 can further hold additional data 134, such as event data, patient data, data of the CPR device, and so on. For example, data gathered according to embodiments could be aggregated in a database over a period of months or years and used to search for evidence that one pattern or another of CPR is consistently better (in terms of a selected criterion) than the others, of course correlating with the patient. For example, the outcome of the administered CPR could be tracked and/or linked to the particular CPR technique and/or cardiac event type suffered by the patient. Data could be de-identified so as to protect the patient privacy. If so, this could be used to adapt the devices to use that pattern either continuously or at least as one of their operating modes.

The controller 110 may include or cooperate with a communication module 190, which may communicate with other modules or functionalities wirelessly, or via hard-wired connections. The controller 110 may include or be communicatively coupled with a user interface 114 that receives and displays user instructions and settings, outputs data, alerts and/or prompts the rescuer, etc. The communication module 190 may further be communicatively coupled with another communication device 192 and/or another medical device 194 and can also transmit data 134 to a post-processing module 196, in some examples. Wireless communications may be by Bluetooth, Wi-Fi, cellular, satellite, near field, etc. Data 134 may also be transferred via removable storage such as a flash drive. Other communication device 192 can be a mobile display device, such as a tablet or smart phone. Other medical device 194 can be a defibrillator, monitor, monitor-defibrillator, ventilator, capnography device, pulse oximeter, regional oximetry device, and the like.

In some example embodiments, the communication module 190 can be configured to receive transmissions from such other devices or networks. Therapy can be synchronized, such as ventilation or defibrillation shocks with the operation of the CPR device. For example, the CPR device may pause its operations for delivery of a defibrillation shock, after detection of a patient's electrocardiogram (ECG), and if the device operation needs to be restarted. If the defibrillation shock has been successful, then operation of the CPR device might not need to be restarted.

The controller 110 can also include a post-processing module 196 that can include a medical system network in the cloud, a server such as in the LIFENET® system, available from Physio-Control in Redmond, Washington. The data 134 can then be used in post-event analysis to determine how the CPR device was used, whether it was used properly, and to find ways to improve performance, training, or for any other use. The controller 110 can be configured to control driver system 141, as indicated by arrow 118, and can be implemented by wired or wireless signals and so on. Accordingly, chest compressions can be performed on the chest of patient 182 as controlled by controller 110.

In some embodiments, one or more physiological parameters of patient 182 are sensed, for example measured end-tidal $CO_2$ ($EtCO_2$), return of spontaneous circulation (ROSC) detection, pulse oximetry, regional oximetry, or any other patient parameter. Upon a physiological parameter being sensed, a value of it can be transmitted to controller 110, as suggested via arrow 119, through wired or wireless transmission. The transmitted values may further affect how the controller 110 controls the driver system 141.

The controller 110 may be implemented together with the retention structure 140, in a single CPR chest compression device. In such embodiments, arrows 118, 119 are internal to such a CPR chest compression device. Alternately, the controller 110 may be hosted by a different device that communicates with the CPR chest compression device and uses the retention structure 140. Such communication can be wired or wireless. The different device can be any kind of device, such as the other communication device 192 or the other medical device 194. An example is described in U.S. Pat. No. 7,308,304, titled "COOPERATING DEFIBRILLATORS AND EXTERNAL CHEST COMPRESSION MACHINES," the description of which is incorporated by reference in its entirety. Similarly, the user interface 114 may be integrated on the CPR chest compression machine, or on another device.

In some examples, the compressions are performed automatically in one or more series, and perhaps with pauses between them, as controlled by the controller 110 and instructed by the processor 120. A single resuscitation event can be sets of compressions for a single patient and can include active decompression if the device has active decompression capabilities. The driver system 141 can be configured to drive the compression mechanism automatically according to the compression profile. The compression profile can be such that the driving can cause the compression mechanism to repeatedly perform the compressions and active decompression, if present. The chest can be compressed downward from the resting height for the compressions, and then decompress at least partially after each applied compression. Several of the compressions can thus compress the patient's chest by at least 2 cm downward from the resting height, and frequently more, such as 5 cm or 6 cm, for example.

In some embodiments, a force sensing system 149 is included. In embodiments, the force sensing system 149 can be configured to sense an amount of a compression force exerted by the driver system 141 when the chest of the patient has been compressed downward by a certain amount from the resting height. That certain amount can be, for example, 1 cm, 2 cm, or more.

The force sensing system 149 may be implemented in different ways. For example, it may include a force sensor, or it may include a strain gauge or a measuring spring with a known spring constant. Such a strain gauge or a measuring spring can be coupled between the compression mechanism 148 and the driver system 141 or the retention structure 140. In some embodiments, the driver system 141 operates by receiving an electrical current, and the force sensing system 149 includes an electrical detector configured to detect an amount of the electrical current. In other embodiments, the force sensing system 149 includes an accelerometer, a force-sensing resistor, a piezoelectric force sensor, and/or a pressure sensor within a suction cup and/or in a back plate of retention structure 140. In still other embodiments, the force sensing system 149 measures a difference between forces and infers a force on the patient. In yet other embodiments, a force on a patient stabilization strap is measured which may have a lateral component, for example, from the patient shifting within retention structure 140.

The sample CPR device described in FIG. 1 can be configured so its chest compressions, zero-position of the device, or both are adjusted. The adjustment can occur by determining one or both of a chest compression depth of applied compression, which can occur before chest compressions begin or after any one or more single or groups of chest compressions are administered to the patient. Oftentimes, patients experience chest collapse during a cardiac event or while chest compressions are being administered. Chest collapse occurs because bones, such as the patient's ribcage bones, cartilage or organs are move, reshaped or damaged from the cardiac event, from the applied chest compressions or decompression force if any, or for any other reason. Chest collapse is a decrease in the chest height of the patient over time. The disclosed CPR devices account for chest collapse as the CPR chest compressions are administered by adjusting one or both of the zero-position, which is the "starting" position of the chest compression mechanism or the compression depth of the chest compressions, which is the distance the chest compression travels to administer the chest compressions. The zero-position of the CPR device is determined based on the patient's resting chest height measured before the chest compressions begin or after one or more chest compressions or a group of chest compressions are administered. The zero-position of the CPR device can be evaluated in its "present" state, which means the current zero-position of the CPR device, whether that is prior to chest compressions have begun or between chest compressions or groups of chest compressions. Similarly, the initial depth of the chest compression can be the compression depth of the first chest compression or the first in a series of chest compressions that are applied to the patient. As discussed above, the zero-position, the chest compression depth, or both can be adjusted throughout CPR administered to a patient. In some embodiments, the CPR device may be configured to estimate the initial chest height based on whether the patient has received manual chest compressions from a rescuer prior to application of the CPR device. For example, the CPR device may have a user interface allowing the operator to input whether manual CPR has been performed on the patient.

Figure 2:
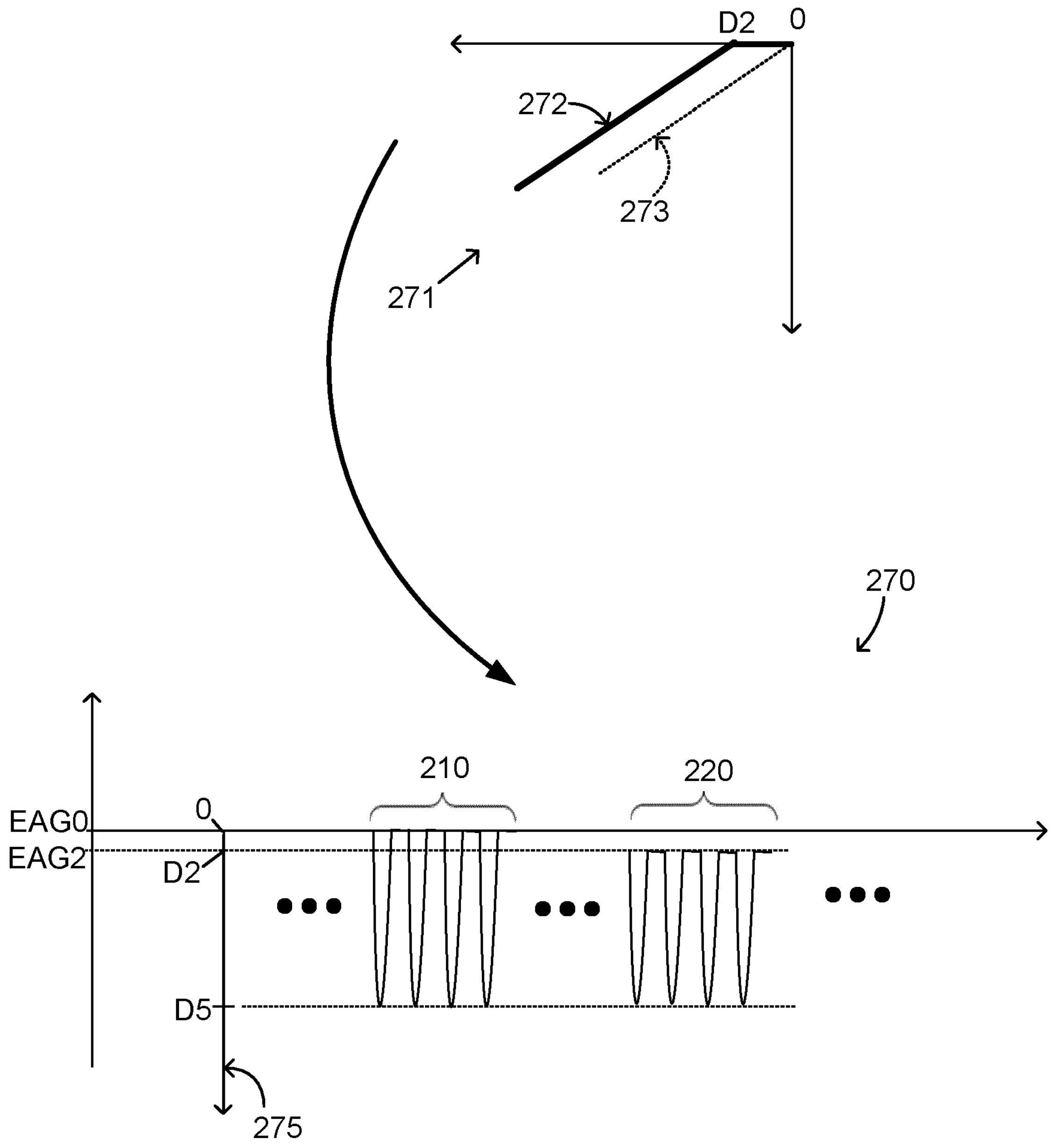
FIG. 2 is a composite diagram showing a sample way in which a motion-time profile may be adjusted according to a detected compression force.

Turning now to FIG. 2, as seen in diagram 270, the chest compressions of a group 210 start from the initially determined chest resting height (EAGO), and reach a maximum compression depth D5, measured on minor axis 275. As seen in diagram 271, the sensed amount of the compression force is plotted as a line 272 that is different from line 273. In other words, the sensed amount of the compression force is different from what was expected, or from what was previously sensed in the same session, which could indicate that the resting chest height has changed, and it is now lower, at depth D2. The change in chest height can happen because the chest may lose its compactness, and starts breaking down, due to the chest compressions, i.e., the patient is suffering from chest collapse.

The resting height lowering means that the compressions of group 210, which start from the earlier-determined chest resting height EAGO, now impact the chest as their depth crosses the value of D2. In some examples, the resting chest height is determined at a first time instant, such as at the beginning of a session with the patient. The resting chest height may then be determined at a second time instant, which occurs after a set of the compressions has been performed after the first time instant. The resting height in the second instant may be updated from what was determined in the first instant. The resting height is measured in any suitable way, such as various sensors like the output of the force sensing system discussed above in FIG. 1.

In the example of diagram 271, the updated resting height is determined, after compressions group 210, to be D2. In such embodiments, the applied chest compressions, through a compression profile, can be adjusted in view of the resting height which is determined at the second time instant. In the example of FIG. 2, the compression profile is adjusted by setting the new resting height at D2, or EAG2, and thus resetting the zero-position of the CPR device to a new value.

The updated resting height may be discovered also in different ways. The CPR device may pause occasionally, and search for the resting height, for example with small oscillations. In some embodiments, a force value is stored in memory 130 for the force(s) detected by the force sensing system, if one is included in the CPR device. The force value may encode the sensed amount of the compression force, especially if an alert condition has been met. The force value can be of one point, or many, such as in creating line 272. In some embodiments, communication module 190 is configured to communicate the force value.

This approach also can be used for systems that can apply active decompression, such as through using a suction cup or other adhesive attachment, to keep the compression device "attached" to the patient's chest, as well as systems that do not have such "decompression attachment" mechanisms. In systems without an "attachment" mechanism, some embodiments disclosed herein do not use a "counter force" mechanism to control the force of the chest compression mechanism to keep the pressure plate in contact with the chest during natural decompression, as described in US 2013/0218056, which is incorporated by reference herein in its entirety. In some alternative embodiments, the CPR device includes structures that are configured to apply lateral support and/or lateral forces to the sides of the patient's chest, as described in US 2015/0272822, which is incorporated by reference herein in its entirety.

In some example embodiments, in addition to changing the zero-position of the mechanical CPR device to follow the diminishing rest height, as discussed above in reference to FIG. 2, the disclosed mechanical CPR devices also vary the compression depth as a function of the diminishing rest height or with the changing zero-position of the CPR device. The mechanical CPR device may adjust the compression depth by adjusting the chest compression mechanism movement (e.g., such as a piston stroke), adjusting the position of the compression unit relative to the patient, adjusting both the chest compression mechanism movement and the compression unit position, adjusting the distance traveled by the patient's chest during a compression, or any combination of these system parameters. Following the teachings of this disclosure, those skilled in the art of mechanical CPR devices may adapt other mechanisms to adjust the zero-position of the mechanical CPR device in addition to the examples discussed above and in combination with the adjustment of the compression depth.

As mentioned above, the components of the disclosed CPR device shown in FIG. 1 have a chest compression mechanism and a processor. When driven, the chest compression mechanism administers chest compressions to the chest of a patient suffering a cardiac event. The chest compressions each have a chest compression depth. The patient's chest has a resting chest height, both before chest compressions begin and again between each delivered chest compression. As discussed above, the chest compression depth can be measured either by the distance traveled by the patient's chest from its resting height, by the distance traveled by the chest compression mechanism itself or as the patient's initial chest height compared to the patient's residual chest height at a full compression. The processor generates instructions for the chest compression mechanism to deliver chest compressions to the patient according to a default or a customized routine, such as a compression profile, for example. The instructions are transmitted to the controller that then drives the chest compression mechanism to carry out the routine.

Figure 3:
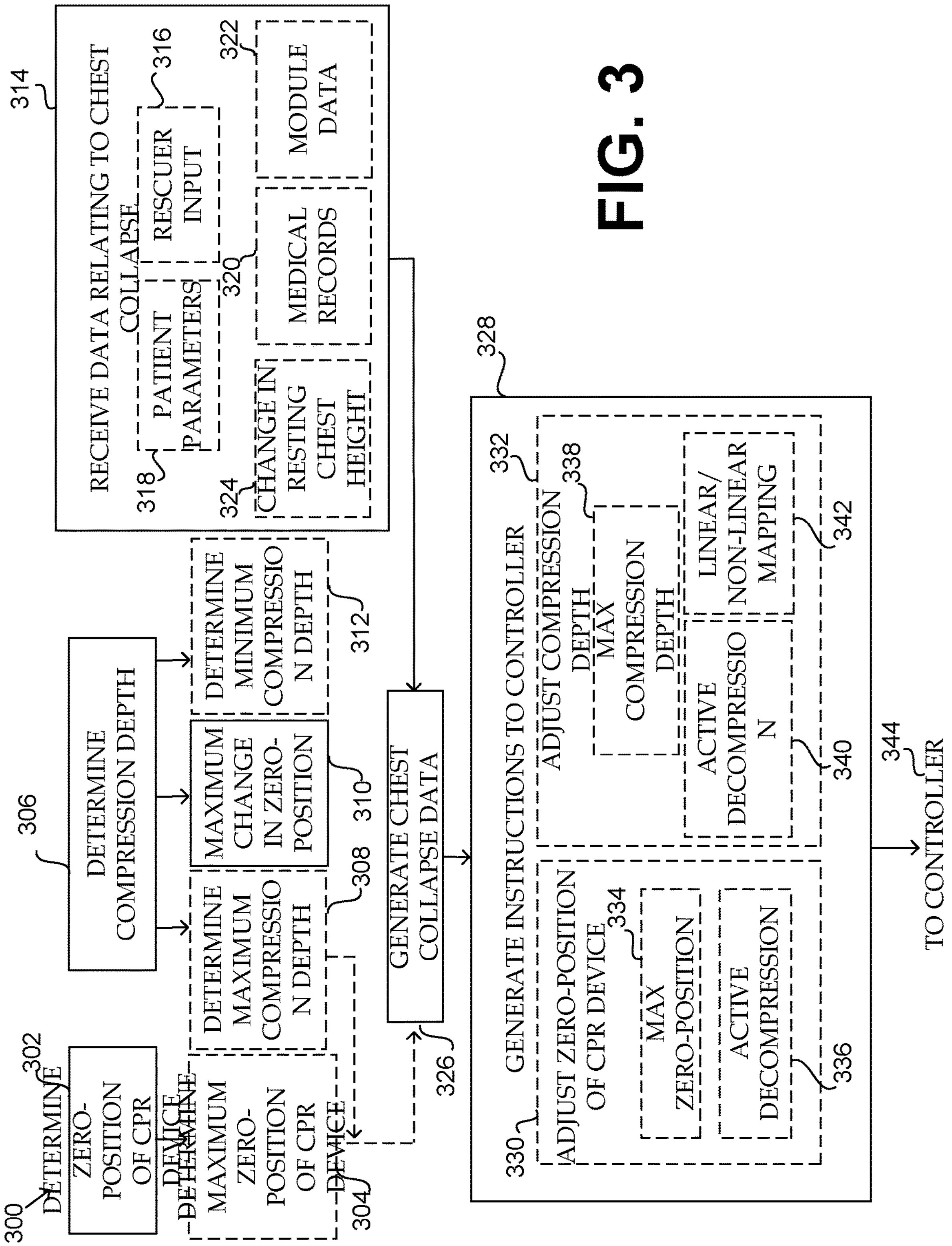
FIG. 3 is a flowchart of the operation of an example CPR device.

FIG. 3 shows an example system 300 in which a processor analyses various data, including input, and generates additional data and instructions based on that additional data. For example, the processor is configured to determine a present zero-position 302 and a maximum zero-position of the CPR device 304 for one or more of the chest compressions, in some examples. Also, the processor is configured to determine the chest compression depth 306 for any compressions to be administered and one or more, in any combination, of a maximum chest compression depth 308, a maximum change in zero-position of the CPR device 310, and/or a minimum compression depth 312. The processor can also be configured to receive information about whether the patient suffers from chest collapse 314 and/or can receive information from a rescuer about the patient 316, patient parameter data 318 like as patient physiological data sensed by one or more sensors, stored data like medical records 320, connected modules 322 like ECG and imaging modules, and the like. The processor can also receive data from any source about the patient's change in resting chest height or as the patient's initial chest height compared to the patient's residual chest height at a full compression 324. The processor can receive any relevant data about the patient from any source that is either integrated within the CPR device or remotely situated and electrically coupled to the CPR device through a wireless or hard-wired connection. The processor can also receive rescuer data from a rescuer, including observed patient condition data.

For example, the processor receives one or more of rescuer input relating to a patient's chest collapse, one or more patient parameters that indicate that the patient suffers from chest collapse, or chest collapse data indicative of a change in the resting chest height of the patient over multiple administered chest compressions whether those chest compressions are manually administered or administered mechanically by the CPR device disclosed here or any other CPR device. The processor can receive any combination, including multiples of each type of data that relate to a patient's chest collapse.

The processor is configured to generate chest collapse data 326 based on all or any combination of the input or data it receives about a patient's chest collapse. In response to generating the chest collapse data, the processor generates instructions that can be sent to the controller 328 or other driver system that drives the chest compression device to administer chest compressions to the patient. The generated instructions can include an instruction for the controller or other driver system to adjust the zero-position of the CPR device 330 and the compression depth of the chest compression 332, which can be either the distance the patient's chest is compressed or the distance traveled by the chest compression mechanism or the patient's initial chest height compared to the patient's residual chest height at a full compression, based on the chest collapse data. In some examples, if a maximum zero-position for the CPR device is set, then the zero-position can be adjusted up to the maximum zero-position of the CPR device 334, as shown in FIG. 3. For those CPR devices that have active decompression, such as the example shown in FIG. 3, the processor can also adjust the zero-position of the CPR device based on the active decompression as well. In some embodiments, some or all of this data is stored in non-volatile memory so that it is not lost if the CPR device's power is interrupted (e.g., a battery runs out of stored power or is swapped out of the CPR device). This allows the CPR device to "know" the chest heights, zero-positions, etc. when power is restored.

FIG. 3 shows that the processor also adjusts the compression depth 332 of the administered compressions. In this example, the compression depth is adjusted up to a maximum compression depth 338, which can also affect the depth of the active decompressions 340 as well, in the examples that include active decompression, such as shown in FIG. 3. As discuss further below, the compression depth can be adjusted linearly or non-linearly 342 or according to some other profile in some examples. The compression depth only changes up to its maximum compression depth at which point it remains constant at the maximum depth for the remainder of any additionally administered chest compressions, if any. Likewise, if a maximum chest compression depth is set, then the compression depth can be adjusted up to the maximum chest compression depth. The processor's generated instructions include an instruction to adjust the zero-position of the CPR device and the chest compression depth of the administered chest compressions. The instructions can also include an instruction for the controller to drive the chest compression mechanism to administer chest compressions to the chest of the patient based on the adjusted zero-position and the adjusted compression depth of the CPR device 344.

Figure 4:
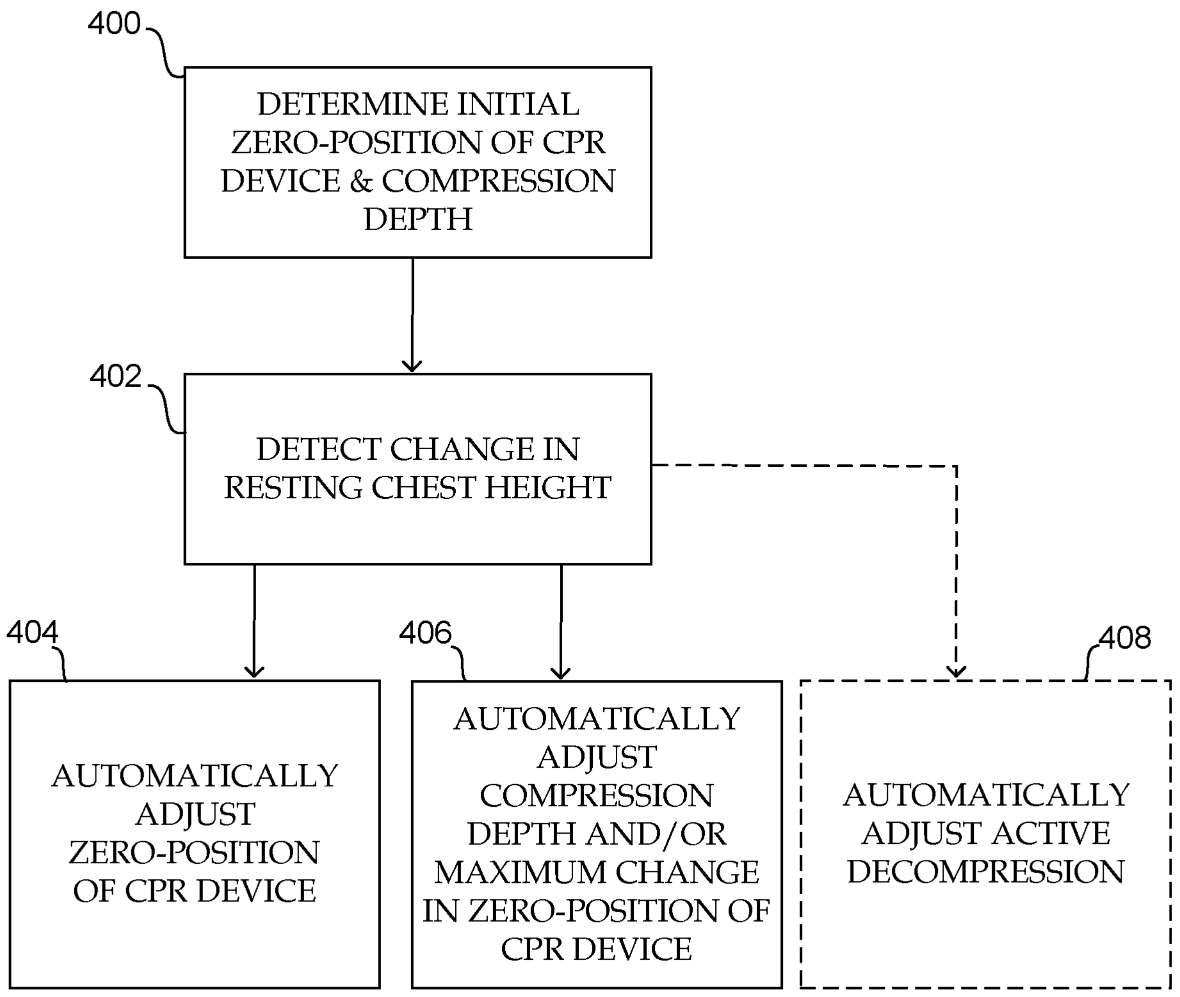
FIG. 4 is another flowchart of a different example CPR device.

In another example shown in FIG. 4, the processor is configured to determine a zero-position of the CPR device for at least one of the chest compressions to be administered to the chest of the patient and also determine a chest compression depth of the chest compression mechanism 400. The processor can then detect a change in a resting chest height of the patient 402. In response to the detected changes in the resting chest height of the patient while administering chest compressions, the processor can also be configured to automatically adjust the zero-position of the CPR device 404 and generate instructions to transmit to the controller to drive the chest compression mechanism to administer chest compressions to the chest of the patient based on the adjusted zero-position. This kind of adjustment to the zero-position of the CPR device can occur before chest compressions begin or after any administered chest compression prior to a subsequently administered chest compression. It can occur after each chest compression, after a series of chest compressions, after a period of time, or after a threshold or target change in the resting height of the patient.

For example, as a patient's chest collapses while receiving CPR, the mechanical CPR device determines a change in "resting" chest height (i.e., the change in chest height due to chest collapse, as discussed above) and, in response: (1) adjusts the zero-position of the mechanical CPR device to match the change in "resting" chest height; and (2) also adjusts a "compression depth" of the CPR device (either a chest compression mechanism position, such as piston stroke or the distance the patient's chest travels during an applied chest compression) to change the chest compression depth to map the change in chest height. The change in compression depth can mirror the change in chest height or can be some variation of the change in chest height, such as a fraction of the change in chest height or the like. Also, the change in compression depth can also change with the change in chest height but at a slower pace, such as tracking a particular target change in chest height or a target pace at which the patient's chest height is changing or collapsing.

In the example shown in FIG. 4, the chest compression depth also can be adjusted up to a maximum compression depth 406, and/or maximum change in zero-position, in some examples. The maximum compression depth can be a depth that would avoid injury to the patient's organs, blood vessels, or the like or is customized to the patient's biological or physiological parameters. The maximum compression depth can be measured by any suitable means including measuring the distance traveled by the chest compression mechanism, such as a piston stroke, or by the distance traveled by a patient's chest during a compression. Similarly, the active decompression, if the CPR device includes active decompression capabilities, can also be automatically adjusted based on the changes in the resting height of the patient 408, as shown in FIG. 4.

Figure 5:
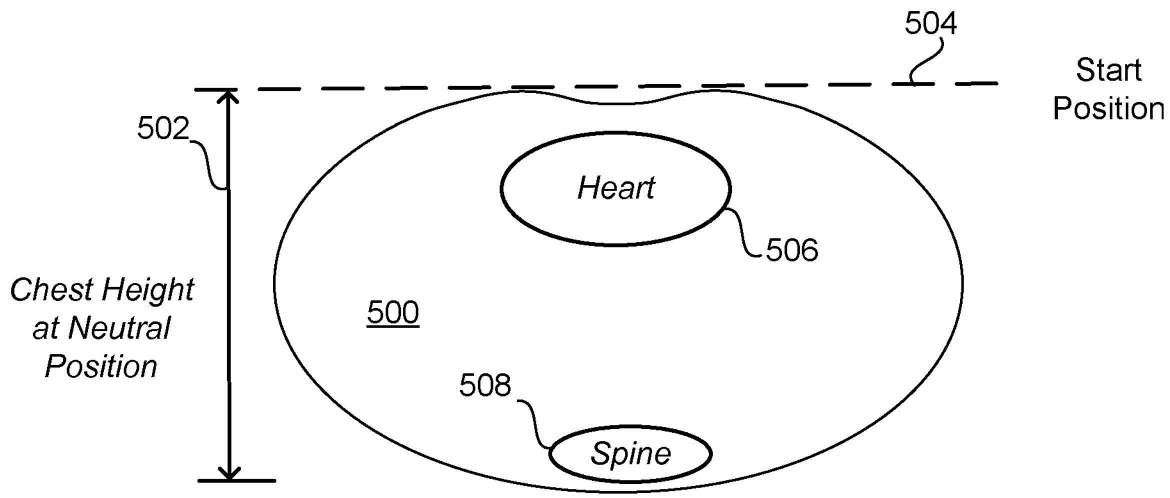
FIG. 5 shows a cross-section of a patient's torso with the chest at a neutral position.

FIG. 5 shows the patient's torso 500 with its chest height at a neutral position prior to any chest compressions being administered 502. The dashed line shows the start position or "resting height" of the patient's chest 504. When the CPR device is positioned to administer chest compressions, it is be positioned to contact the anterior surface of the patient's chest so that the chest compression mechanism is aligned with the patient's heart 506 to compress the heart 506 towards the patient's spine 508.

As discussed above, the patient's chest height can be determined before chest compressions begin or between chest compressions or a series of chest compressions.

Figure 6:
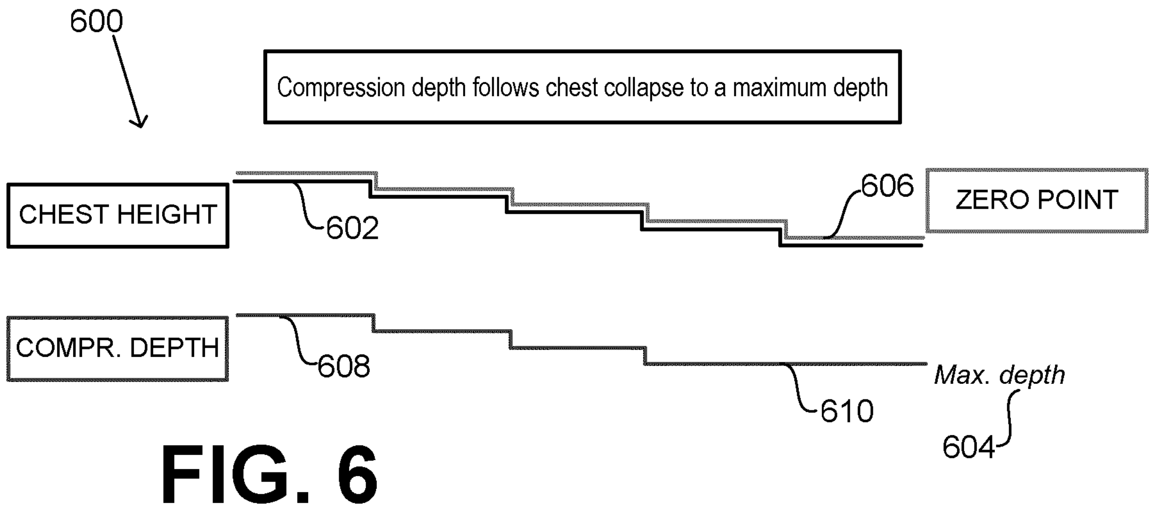
FIG. 6 is a chart mapping compression depth as it follows chest collapse up to a maximum compression depth.

FIG. 6 shows a chart of the compression depth 600 being adjusted with the changing chest height 602 up to a maximum allowable compression depth 604. The chest height 602 and zero point 606 of the chest are slightly offset in the figure to clearly illustrate their progression over a series of chest compressions. The compression depth 608 changes over the applied chest compression in a way that mirrors the change in the chest height 602 of the patient until it reaches the maximum compression depth 604 set by the CPR device. Once the compression depth reaches its maximum 604, it remains at a constant depth 610 equal to the maximum depth until chest compression terminate in the example shown in FIG. 6. The chest compression depth is limited by the set maximum chest compression depth for the remaining chest compression or a specific number of or time period of additional chest compressions, in this example. In other examples, the compressions can terminate when the maximum chest compression depth is reached.

In one embodiment, the maximum compression depth is set so that the distance between a pressure plate of a piston-type chest compression mechanism and the top surface of the back plate on which the patient is supine is 7 cm. The pressure plate is integrated in the chest compression mechanism and the back plate is the surface on which the patient's back rests in the supine position. The maximum compression depth can be measured by the distance traveled by the piston from the initial zero-position or the estimated initial zero-position (e.g., when manual CPR was previously performed), in some examples. In some embodiments, the CPR device includes a back plate or support structure with a pressure plate integrated within the chest compression mechanism that detects the force applied to the patient's chest during chest compressions. The back plate is mechanically designed so that the maximum extension of the pressure plate of the chest compression mechanism during a compression is 7 cm above the highest point of the back plate. In other embodiments, this distance can be programmed or set into the CPR device to allow users to select a different minimum distance between the pressure plate and back plate, such as within a range of 7-10 cm.

In this example, the processor receives input from a rescuer and generates instructions for the controller to drive the chest compression mechanism to this upper limit of the maximum chest compression depth or maximum extension of the pressure plate in this example. At the maximum compression depth, the processor can be configured to either limit the compression depth at the maximum compression depth and continue chest compressions or terminate chest compressions when it reaches the maximum compression depth. In other embodiments, in addition to the maximum compression depth, the device is also configured with a maximum change in zero-position, which can also be measured from the initial zero-position measured before chest compressions began in some examples. The maximum change in zero-position can be set at 5 cm. In other embodiments, a user, such as a rescuer, can select or set the maximum change in the zero-position of the CPR device. For example, a rescuer sets the maximum change in zero-position of the CPR device within a range of 4-10 cm. In this example, the user is the rescuer although in other examples, discussed further below, the user can include others involved in treating the patient, such as remotely-located medical professionals at a central command center. The term user or rescuer includes both a single rescuer and multiple rescuers and extends to all rescuers providing CPR treatment to the patient regardless of physical location or proximity to the patient.

In other embodiments, the maximum depth and/or zero-position change can be configured as a fraction of the initial chest height of the patient or the initial zero-position of the CPR device. For example, in some embodiments measuring the compression depth as the distance traveled by the chest compression mechanism from its zero-position, the maximum compression depth and/or zero-position change for adults ⅔ for compression depth and/or ⅓ for zero-position change. For children, the maximum compression depth is ⅓ and/or the maximum zero-position change is ⅙. In some embodiments, the maximum compression depth can be set or programmed into the CPR device by a rescuer as a default setting, such as by the processor receiving the rescuer input, which can be either manually input or the processor could generate a prompt to request that the rescuer set the maximum compression depth and/or maximum zero-position. In another embodiment, the maximum compression depth and/or maximum zero-position can be automatically determined by the mechanical CPR device as a function of the initial zero position or can be adjusted by a rescuer after examining the patient, etc. In some embodiments, the CPR device is configured to "automatically adjust" the zero-position at a defined rate, e.g., over a set time period or changing time period, tracking a pace of the chest collapse, or the like. For example, the CPR device can be configured to automatically adjust every 2 minutes while chest compressions are being administered, or any other time period, or when a force threshold is reached or a particular pace of the chest collapse is sensed.

In a further enhancement of the above embodiment, in CPR devices that also have active decompression, the amount of active decompression can also depend on the zero-position of the patient's chest as it changes due to chest collapse. For example, the CPR device can be configured to implement a maximum "uplift" of the patient's chest from the zero-position during active decompression. The maximum uplift is the maximum amount of active decompression that can be applied, including any characteristics of active decompression, like uplift force or distance, for example. In one example, the maximum uplift is 5 cm, while in other embodiments it can range from 1-10 cm. In other embodiments, the maximum "uplift" from the zero-position can be based on a force measurement, such as the active decompression can be set by default or rescuer input to be set or selected in the range of 13-550 N.

In another embodiment, as the chest collapses during CPR, the mechanical CPR device determines the change in "resting" chest height and, in response: (1) adjusts the zero-position of the mechanical CPR device to match the change in "resting" chest height; and (2) also adjusts its chest compression mechanism position to change the compression depth linearly with the change in chest height as measured from the initial chest height. In this example, the compression depth is measured as the chest compression mechanism's amplitude. This linear mapping of the chest compression depth to the change in the zero-position of the patient can occur up to a maximum compression depth as measured from the initial zero-position, in some examples, although in other examples CPR device may have a maximum compression depth that is limited by the dimensions and/or implementation of its hardware. For example, if the reduction from the initial chest height is $\Delta D_{CH}$, then the change in compression depth $\Delta D_{CD}$ is:

$$\Delta D_{CD}=\alpha(\Delta D_{CH}),\text{ where } \alpha \text{ is less than } 1$$

Figure 7:
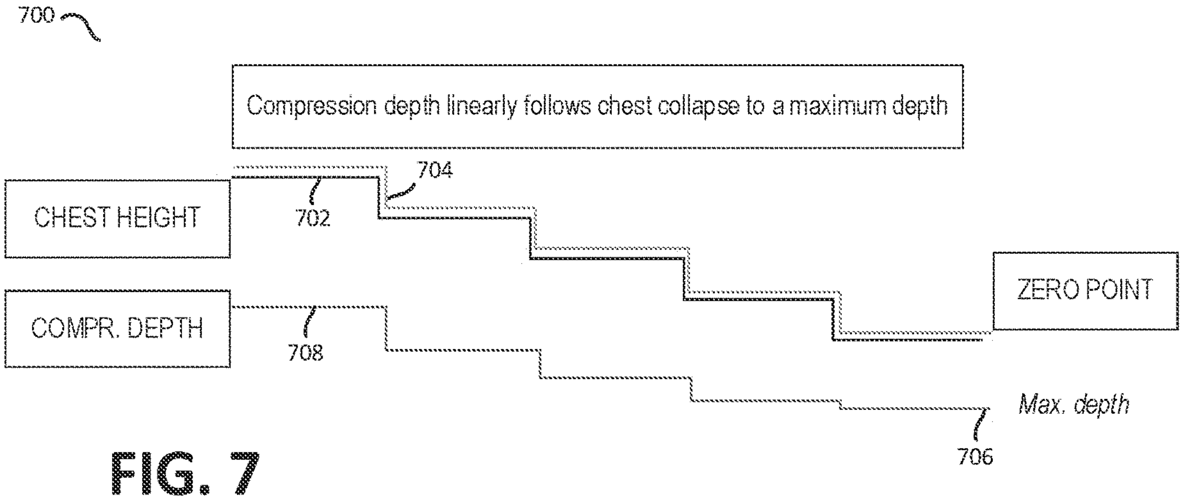
FIG. 7 is a chart mapping compression depth linearly as it follows chest collapse up to a maximum compression depth.

This linear change in compression depth with the change in chest height 700 is illustrated in FIG. 7 with the chest height 702 and zero-position 704 slightly offset in the figure so that both can be easily illustrated. The maximum compression depth 706 measured from the initial zero-position of the patient's chest can be determined and set as described in any of the disclosed examples. The compression depth 708 changes linearly with the change in the chest height. That is, the compression depth steadily decreases in a linear progression with each chest compression and each change in compression depth consistently is smaller until it reaches the maximum compression depth. In addition, in embodiments having a maximum change in zero-position, such as the example shown in FIG. 7, this maximum change in zero-position can be determined in any suitable manner discussed herein. In embodiments using bands or belts instead of pistons or plungers, chest collapse may be detected in other ways, such as by detecting a change in intra-thoracic impedance, which may be related to chest volume. In the corresponding examples with a belt or band for the chest compression mechanism, the maximum chest compression depth relates to a maximum constricting force and/or reduction in circumferential length of the band or belt. As discussed above, any suitable chest compression mechanism can be adapted to the disclosed technique of mapping the compression depth and/or the zero-position to the chest collapse of the patient.

Figure 8:
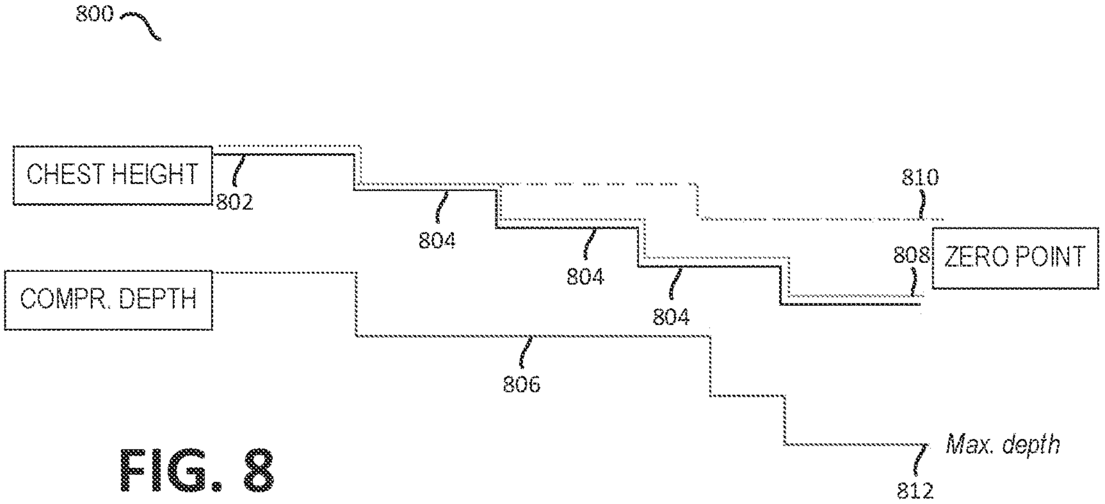
FIG. 8 is a chart mapping compression depth non-linearly as it follow chest collapse up to a maximum compression depth.

In another embodiment, as the chest collapses during CPR, the mechanical CPR device determines the change in "resting" chest height and, in response: (1) adjusts the zero-position of the mechanical CPR device to match the change in chest height; and (2) also adjusts its compression depth to change non-linearly with the change in chest height or zero-position. In this example, the compression depth is measured as the chest compression mechanism's amplitude. In this case, the mapping occurs differently than the above example with linear mapping, but the techniques to determine chest compression depth and/or zero-position of the CPR device can be performed in a similar or the same manner. The compression depth change shown in FIG. 8 in this example can be mapped non-linearly up to a maximum compression depth as measured from the initial chest height 800. As shown in FIG. 8, the chest height changes 802 can be divided into ranges 804, with the compression depth remaining constant 806 while the chest height is within that range of heights 804. Each range has a compression depth that is different from one or more of the other ranges. Additionally, the zero-position 808 can change linearly with the change in the patient's chest height, as shown by the solid line of the zero-position in FIG. 8 or can also be changed non-linearly as shown in the dashed line 810 in FIG. 8. For the non-linear changes in zero-position, it can follow a similar non-linear pattern as the change in compression depth or it could differ from the change in compression depth depending on the desired configuration of the CPR device. Following the teachings of this disclosure, those skilled in the art of mechanical CPR devices can implement other linear and non-linear functions to "map" chest height to compression depth and/or zero-position. In other embodiments, the CPR device can have a maximum compression depth 812 which may also depend on a maximum compression force threshold for the chest compression mechanism. For example, if the compression force reaches 600 N, the processor generates an instruction for the CPR device to limit the chest compressions to the associated maximum compression depth 812 or to terminate the chest compressions or to change one or more characteristics of the administered chest compressions, such as force, compression depth, zero-position, etc.

Figure 11:
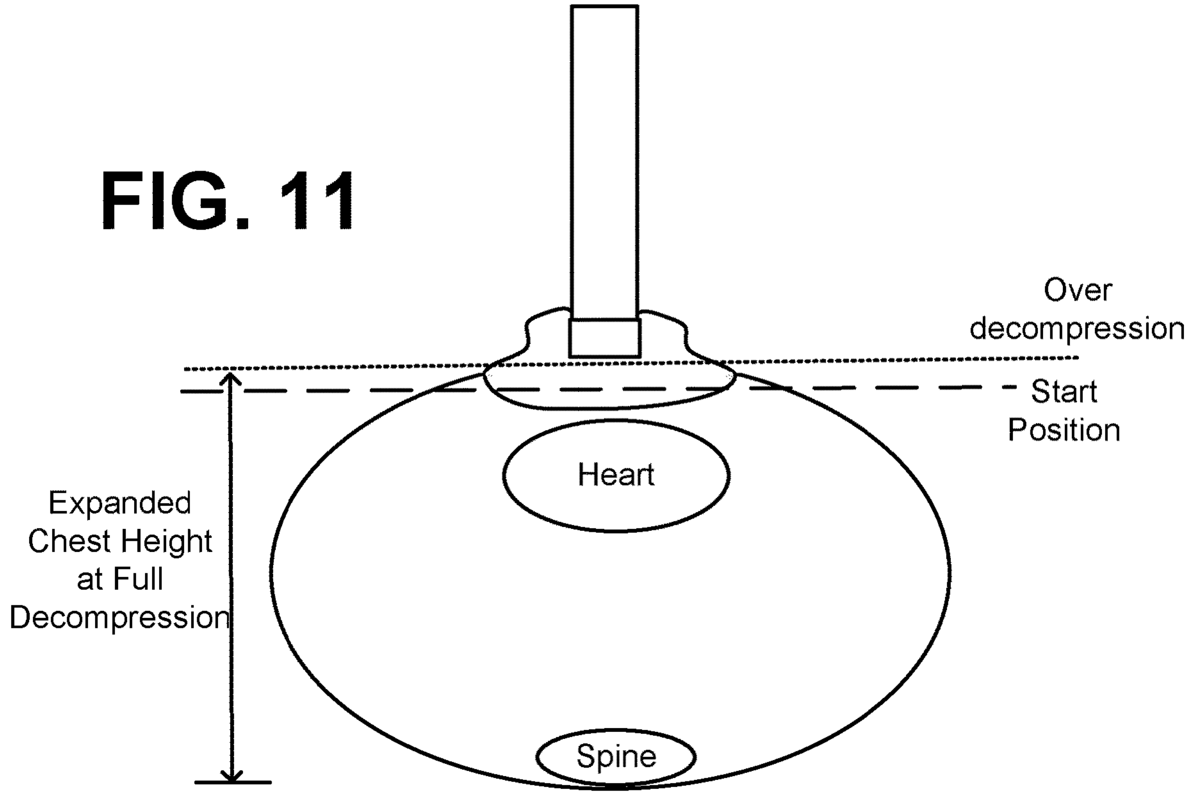
FIG. 11 shows a cross-section of the patient's torso shown in FIG. 3 with the chest compression mechanism applying active decompression.

In another embodiment, as the chest collapses during CPR, the mechanical CPR device determines the change in "resting" chest height and, in response: (1) adjusts the zero-position of the mechanical CPR device to match the change in chest height; (2) adjusts compression depth, either the compression mechanism's amplitude or the distance the patient's chest travels during a compression; and (3) in a subsequent detection of chest collapse, the device while keeping the same zero-position, administers active decompressions and alters the compression depth so the compressions reach the same anatomical structure during each compression as before the change in chest height or chest collapse occurred, i.e., increasing the stroke length of a piston- or plunger-style compression mechanism but not changing the in-patient or depth to target anatomical structure depth. For example, the target anatomical structure is the patient's heart, as shown in FIGS. 9-11 below.

Some of the example CPR devices disclosed here have or communicate with an imaging module, such as an ultrasound imaging module, which is configured to detect the anatomical structure. The position of the anatomical structure can then be used to further adjust the zero-position of the CPR device and/or the chest compression depth. The imaging module is electrically coupled, either by wireless or hard-wired connection, to the processor that receives the imaging input and determines the adjusted zero-position and/or compression depth additionally based on the imaging input. The imaging module can be any suitable imaging device including, but not limited to, ultrasound, ultra-wide band (UWB) imaging systems, or other imaging technology. In a further enhancement, the CPR device may be configured to change the zero-position of a subsequent chest compression if the chest height further decreases or may also be configured not to change the zero-position on a subsequent change in "resting" chest height based on the imaging input.

In another embodiment, the mapping of the change in chest height to a change in compression depth may depend on other patient or other parameters, such as the age of the patient, the size of the patient, the gender of the patient, whether the patient has an implanted cardiac assist device, whether a ventilator is being used, whether a defibrillator is being used, etc. For example, the CPR device may be configured to receive input from a rescuer for one or more of these parameters. The rescuer input can be observed data, such as the rescuer observing the condition of the patient or other input like whether the patient received prior manual or mechanical CPR prior to using the disclosed CPR device. As with any of the other sensed, observed, generated, measured, stored, or other input discussed in this application, the processor receives the input and can generate instructions regarding adjusting the zero-position and/or the compression depth of the CPR device.

Some of the example CPR devices have a communication module that is configured to request and/or receive information from ventilators, defibrillators, etc., and/or data (e.g., age, gender, implanted devices) from a patient care record database. The communication module transmits the data to the processor that determines whether to additional adjust the zero-position and/or the compression depth of the CPR device based on this information. For example, the increase in compression depth as the chest collapses may be reduced more quickly for children and elderly patients. Patients concurrently receiving ventilation therapy with CPR may have an inflated chest cavity which alters the patient parameters if the same patient were not receiving the ventilation therapy.

The communication module can also communicate with a remote computing device. The remote computing device can be any type of remote computing system such as a central server that stores medical data about a patient or addition algorithms or routines that can be used to help the processor of the CPR device determine the adjusted zero-position and/or the adjusted compression depth. The remote computing device can also be a command center in which the rescuer of the CPR device can communicate with other medical or other types of professionals or rescuers that are physically located at a remote station from the patient receiving CPR. For example, the remote professional are medical professionals that can help aid the rescuer in administering emergency care to the patient, operating the CPR device, and also those at a medical facility that can help prepare for the arrival of the patient during patient transport to the medical facility.

Following the teachings of this disclosure, those skilled in the art of mechanical CPR devices will appreciate that other embodiments of the present invention can have different functions or mappings to adjust the compression depth in response to a change chest height and/or other parameters. Also, those skilled in the art will appreciate that data from anywhere can be transmitted to or from the CPR device to be used by the processor in determining the adjusted zero-position and/or the adjusted compression depth. Further, the processor is electrically coupled to the chest compression mechanism although it may or may not be integrated into the same housing or physical device. In the example above with a remote command center, the remote command central could control the operation of the CPR device from afar. In the alternative examples with an integrated processor and chest compression device, the rescuer controls the CPR device from the patient's location.

The disclosed CPR devices can be configured to capture, record, and/or transmit (including making the data accessible to rescuers and other users via a port or connector) data related to the changes in zero-position, patient resting chest height, and other parameters of the compressions or the CPR device.

In the disclosed CPR devices that include a decompression attachment mechanism (e.g., suction cup), the CPR device can administer active decompression, the CPR device can capture, record, and/or transmits data related to automatic adaptation of the CPR device compression duty cycle, which can include compression depth/distance, rate, speed up and down of the chest compression mechanism, compression and decompression phase duration, over-decompression distance, overall chest compression mechanism amplitude or movement, and any other data or parameters associated with the active decompression. The CPR devices with active decompression can also capture, record, and/or transmit data related to the automatic adaptation of the CPR device compression initial zero-position to the resting position of the chest before chest compressions start, which is the zero-position from which both compression depth and over-decompression distance are calculated.

Still further, some of the disclosed CPR devices capture, record, and/or transmit, either alone or in combination with each other or any of the data discussed above, data relating to the patient chest height, which is the patient's neutral chest height at rest. Such resting chest height data can include the distance measured by device or user or adjunct technology, and/or the zero force exerted on the chest compression device, such as a piston and or pressure pad and or suction cup if the CPR device has active decompression, and absolute data points or changes in same patient over time.

The disclosed CPR devices can also capture, record, and/or transmit, either alone or in combination with each other, residual patient chest distance at the starting position or default position of the CPR device itself (from the patient's back to the start position of the CPR device), the distance from the patient's back to the start position of CPR device, and/or the force exerted on the chest compression mechanism, such a piston and or pressure pad and/or suction cup (if the CPR device can perform active decompression), at a starting or default position of the CPR device, and the absolute data points throughout administration of the CPR to the patient or changes to it over time. FIG. 9 shows an example CPR device 509 positioned to administer chest compressions to the patient shown in FIG. 5 with the resting chest position 502 of the patient guiding the zero-position of the CPR device 504. In FIG. 9, the chest compression mechanism 510 has a suction cup 512 to perform active decompression and is positioned over an anterior surface of the patient's chest, just above the patient's heart 506. The chest compression mechanism 510 is positioned at the start position or zero-position 504 of the CPR device at which time the patient either has not yet experienced chest collapse or chest compressions with the mechanical CPR device have just begun so this starting point is the zero-position 504 from which the CPR device will be adjusted.

The disclosed CPR devices can further capture, record and/or transmit, either alone or in combination with each other, a residual patient chest distance at full compression (from patient back to deepest compression point of chest), for example. FIG. 10 shows a full compression of the CPR device 509 on the patient's chest in which the chest compression mechanism 510 applies a force to the patient's chest to compress the heart 506. The chest compression mechanism 510 moves from the its starting zero-position to the compression depth 514, which in this example is measured as the distance that the compression mechanism travels during a chest compression. The chest compression mechanism 510 compresses the heart towards the patient's spine 508. The full compression extends the chest compression mechanism to its greatest compression distance for that chest compression, which may or may not be a maximum chest compression depth, if one exists for the CPR device. At the full chest compression depth 514, the patient's chest compresses to a residual chest height 516, which is less than the patient's resting chest height 502 shown in FIG. 9.

The residual patient chest distance at the full compression is the distance that the patient's chest was compressed at the full compression. Also, the disclosed CPR devices can capture, record, and/or transmit the this distance measured by the CPR device or the rescuer or other device component or ancillary technology, and/or the force exerted on the chest compression mechanism, such as the piston and/or a pressure pad and/or a suction cup at the full chest compression. The CPR device can additionally capture, record, and/or transmit the absolute data points or changes over time related to any aspect of the chest compressions that are administered, the adjustments made to the chest compression depth and/or the zero-position, the parameters of the CPR device, and/or any other absolute data points or changes. For example, other data points include tilt, orientation and/or angle of the patient and/or CPR device, Further, the CPR devices can capture, record, and/or transmit data relating to the gap between the resting or neutral position of the patient's chest and the start position or zero-position of the CPR device, the internal distance from the patient's chest to the device pressure pad, and/or the absence of force or a defined amount of force (negative or positive) that is exerted on the chest compression mechanism, such as the piston and/or pressure pad, and/or suction cup at the start position or zero-position of the CPR device, including the absolute data points or changes to this data over time.

For those example devices that have active decompression, such as those shown in FIGS. 9-11, the disclosed CPR devices 509 can further capture, record, and/or transmit, either alone or in combination with each other, an expanded patient chest height at a full decompression or over-decompression position 520, such as shown in FIG. 11. The expanded chest height at the full decompression 520 is greater than the patient's resting chest height before the chest compression or decompression began. The position of the chest compression mechanism at the full decompression 518 is shown to exceed the start position 504 of the chest compression mechanism 510. Example data that can be captured about the over-decompression includes the internal distance from patient's back to the full height of the over-decompression point of chest and/or an absence of force or a defined amount of force (negative or positive) exerted on the chest compression mechanism, such as the piston, pressure pad, and/or suction cup at the start position. Any of this data relating to active decompression can be absolute data points or changes over time, as with the other capture, recorded, and/or transmitted data disclosed here.

The CPR device can still further be configured to capture, record, and/or transmit, either alone or in combination with each other, data relating to the patient's gender, age, length or height, weight, chest circumference, and chest width. Other patient data relating to the patient's cardiac event and/or the CPR treatment can also be captured, recorded, and/or transmitted in a similar manner, such as the duration of the chest compressions administered, whether the chest compressions were manual, mechanical, or assisted. Still further the patient's suspected cause of the cardiac event can be captured, recorded, and/or transmitted, such as coronary or pulmonary thrombosis, accidental hypothermia, pregnancy, trauma, electrolyte imbalances, and the like. Even further data can be captured, recorded, and/or transmitted, either alone or in combination, relating to the CPR device measurements, rescuer input provided to the device, physiological measurements of any kind including, but not limited to, end-tidal $CO_2$ ($EtCO_2$), saturation of peripheral $O_2$ ($SpO_2$), regional oxygen saturation, cerebral oxygen saturation, blood pressure, blood flow, intra-thoracic pressures, ventilation data, and the like, in both absolute data and/or changes over time.

Also in some embodiments, the data can include the change in depth/over-decompression/chest compression mechanism amplitude in relation to the above parameters when chest compressions are designed to, alone or in combination: (1) linearly change compression depth, zero-position, and/or active decompression based on a percentage of anterior posterior chest size; (2) linearly change depth between a minimum and maximum compression depth value or active decompression value or overall chest compression mechanism zero-position; and/or (3) non-linearly change the compression depth or active decompression or overall chest compression mechanism zero-position based on ranges of chest sizes. Also in some embodiments, the data can include the change in force (positive or negative) of the chest compression mechanism, such as the pressure pad, piston, or suction cup, in relation to the above parameters when the chest compressions are designed to: (1) linearly change in compression force or active decompression or overall chest compression mechanism force based on a percentage of chest stiffness; (2) linearly change in force between a minimum and maximum force value or active decompression value or overall chest compression mechanism force; and/or (3) non-linearly change in force based on segments of chest stiffness.

In some embodiments, the mechanical CPR device has a "collapse" mode for use with patients with a collapsed chest, as described above. In the "collapse" mode, various embodiments of the mechanical CPR device operate as described above to diminish compression depth, with or without changing the zero-position of the chest compression mechanism. The processor can receive certain data and then generate instructions to the controller to drive the chest compression mechanism in collapse mode. In some embodiments, the mechanical CPR device has a user interface (UI) that allows the rescuer to input a signal to cause the CPR device to enter the collapse mode. For example, a rescuer may be informed that the patient has been undergoing manual CPR prior to the rescuer's arrival, which caused the patient's chest to collapse before the mechanical CPR device has been deployed for this patient. The rescuer can then use the UI to configure the CPR device into a collapse mode. Accordingly, the CPR device's first compressions can be "reduced" from a default depth, which may initially be set at a depth recommended by the American Heart Association® or European Resuscitation Council® guidelines. In some embodiments, the CPR device is configured to issue one or more prompts to the rescuer to request rescuer input on whether the patient has already received CPR, such as manual CPR. For example, the CPR device issues these prompts when it is initially deployed for the patient. In some embodiments, the UI is electrically coupled to the CPR device through a wireless or hard-wired connection. The UI may be separate or separable from the CPR device and remotely communicate with the CPR device to enter/exit a collapse mode or can be integrated into the CPR device to perform the same function.

In other "collapse mode" embodiments, the mechanical CPR device is configured to automatically detect if the patient has a collapsed chest without rescuer input. For example, some embodiments with automatic collapse mode detection have one or more suction cups or other "attachment" mechanisms. In such embodiments, when the CPR device is initially deployed for a patient, it is configured to attach the one or more attachment mechanisms to the patient's chest and perform an active decompression and/or detect an initial zero-position, as disclosed in U.S. patent application Ser. No. 14/137,721 filed Dec. 20, 2013, which is incorporated herein by reference in its entirety. The CPR device is configured to sense the decompression force during this active decompression and the distance traveled by the suction cup or pressure plate during the decompression to reach a predetermined decompression force. In some examples, the predetermined decompression force is 3 N, but it could be other values in alternative examples, such as a range of 1-25 N. Further, the CPR device can be configured to measure the decompression distance, which if the decompression distance is greater than a threshold, the patient's chest is deemed to be collapsed and the CPR device would automatically enter a "collapse mode." For example, the decompression distance can be 3 cm in one embodiment or a range of distances in other examples.

In other embodiments, the imaging modules discussed above can be used to detect chest collapse. They can either be integrated with or separate but in electrically communication with the mechanical CPR device. The processor can be configured to automatically request data from the imaging module upon activation of the CPR device, which can occur at powering on or upon a rescuer deploying the CPR device for treatment. In another example, upon detection of chest collapse using any of the disclosed methods, the CPR device can be further configured to provide active decompression to a predetermined "height" above the initial chest height detected by the CPR device and/or a predetermined force. In this example, the initial chest height is already collapsed. For example, the active decompression height can range from 0 to 10 cm and the active decompression force can range from 1 to 1000 N.

Other embodiments include combinations and sub-combinations of features described or shown in the drawings herein, including for example, embodiments that are equivalent to: providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, feature or features can refer to the structures and/or functions of an apparatus, article of manufacture or system, and/or the steps, acts, or modalities of a method.

What is claimed is:

1. A cardio-pulmonary resuscitation (CPR) device, comprising:

a chest compression mechanism structured to administer chest compressions to a chest of a patient, the chest compressions each having a compression depth and the chest of the patient having a resting chest height;

a processor configured to:

determine a present zero-position and a maximum zero-position of the CPR device for at least one of the chest compressions to be administered to the chest of the patient;

determine a minimum chest compression depth and a maximum chest compression depth for the CPR device;

receive one or more of rescuer input on chest collapse, one or more patient parameters indicative of chest collapse, or chest collapse data indicative of a change in the resting chest height of the patient over multiple chest compressions; and generate chest collapse data based on the one or more of the rescuer input on chest collapse, the one or more patient parameters indicative of chest collapse, or the chest collapse data indicative of a change in the resting chest height of the patient over multiple chest compressions;

in response to the generated chest collapse data, determine whether: a) to adjust the present zero-position and a compression depth or b) to maintain the present zero-position for a subsequent compression, and, when so determined to adjust, generate instructions to:

adjust the present zero-position of the CPR device based on the chest collapse data up to the maximum zero-position for the CPR device; and adjust the compression depth for the chest compressions based on the chest collapse data to not be less than the minimum chest compression depth and not be greater than the maximum chest compression depth.

2. The device of claim 1, wherein the processor is further configured to:

receive chest compression data indicative of the change in the resting chest height of the patient over multiple chest compressions;

generate the chest collapse data based on the chest compression data indicative of the change in the resting chest height of the patient over multiple chest compressions; and additionally adjust the compression depth for the chest compressions based on the received chest collapse data indicative of a change in the resting chest height of the patient over the multiple chest compressions.

3. The device of claim 1, wherein the processor is further configured to:

receive chest compression data indicative of the change in the resting chest height of the patient over multiple chest compressions;

generate the chest collapse data based on the chest compression data indicative of the change in the resting chest height of the patient over multiple chest compression; and additionally adjust the zero-position of the CPR device based on the received chest collapse data indicative of a change in the resting chest height of the patient over the multiple chest compressions.

4. The device of claim 1, wherein the processor is further configured to send instructions to the chest compression mechanism to administer additional chest compressions that are based on the adjusted zero-position and the adjusted compression depth of the CPR device.

5. The device of claim 4, wherein the processor is further configured to:

generate new chest collapse data based on new chest compression data indicative of another change in the resting chest height of the patient, and, in response to the new chest collapse data, generate instructions to:

utilize the adjusted zero-position for each of the additional chest compressions, administer active decompressions to the chest of the patient, identify an anatomical structure to target for the additional chest compressions and active decompressions, re-adjust the compression depth based on the new chest collapse data, the re-adjusted compression depth reaching the target anatomical structure, and administer the additional chest compressions to the chest of the patient based on the re-adjusted compression depth.

6. The device of claim 5, further comprising an imaging module configured to detect the anatomical structure, and wherein the processor is further configured to receive imaging data from the imaging module that indicates at least one characteristic of the target anatomical structure, and the processor further configured to generate instructions to administer the additional chest compressions to the chest of the patient based on the adjusted zero-position, the adjusted compression depth, and the at least one characteristic of the target anatomical structure.

7. The device of claim 6, wherein, in response to administering the additional chest compressions, the processor is further configured to re-generate the chest collapse data to determine if the patient suffered additional chest collapse, and in response to determining that the patient suffered additional chest collapse, to re-adjust the zero-position.

8. A cardio-pulmonary resuscitation (CPR) device, comprising:

a chest compression mechanism structured to administer chest compressions to a chest of a patient, the chest of the patient having a resting chest height;

a processor configured to:

determine a present zero-position and a maximum zero-position of the CPR device for at least one of the chest compressions to be administered to the chest of the patient, the maximum zero-position determined such that a minimum, non-zero chest compression depth is achieved;

determine an initial chest compression depth of the chest compression mechanism;

receive one or more of rescuer input on chest collapse, patient parameter data indicative of chest collapse, or chest collapse data indicative of a change in the resting chest height of the patient over multiple administered chest compressions; and generate chest collapse data based on the one or more of the rescuer input on chest collapse, the one or more patient parameters indicative of chest collapse, or the chest collapse data indicative of a change in the resting chest height of the patient over multiple chest compressions;

in response to the generated chest collapse data, determine whether: a) to adjust the present zero-position and a compression depth or b) to maintain the present zero-position for a subsequent compression and, when so determined to adjust, generate instructions to:

adjust the present zero-position of the CPR device based on the chest collapse data to a position not greater than the maximum zero-position for the CPR device;

adjust the compression depth for the chest compressions based on the chest collapse data; and administer chest compressions to the chest of the patient based on the adjusted zero-position and the adjusted compression depth of the CPR device.

9. The device of claim 8, wherein the processor is further configured to:

receive chest compression data indicative of the change in the resting chest height of the patient over multiple chest compressions;

generate the chest collapse data based on the chest compression data indicative of the change in the resting chest height of the patient over multiple chest compressions; and additionally adjust the compression depth for the chest compressions based on the received chest collapse data indicative of a change in the resting chest height of the patient over the multiple chest compressions.

10. The device of claim 9, wherein the processor is further configured to:

receive chest compression data indicative of the change in the resting chest height of the patient over multiple chest compressions;

generate the chest collapse data based on the chest compression data indicative of the change in the resting chest height of the patient over multiple chest compressions; and additionally adjust the zero-position of the CPR device based on the received chest collapse data indicative of a change in the resting chest height of the patient over the multiple chest compressions.

11. The device of claim 8, wherein the processor is further configured to:

receive chest compression data indicative of the change in the resting chest height of the patient over multiple chest compressions;

generate the chest collapse data based on the chest compression data indicative of the change in the resting chest height of the patient over multiple chest compressions; and additionally adjust the zero-position of the CPR device based on the received chest collapse data indicative of a change in the resting chest height of the patient over the multiple chest compressions.

12. The device of claim 8, wherein the chest compression mechanism is also structured to apply active decompressions to the chest of the patient, the active decompression having an active decompression force and an active decompression height.

13. The device of claim 8, wherein the instructions to adjust the compression depth include an instruction to both adjust a compression profile of the chest compression mechanism and to adjust a position of the chest compression mechanism relative to the patient.

14. The device of claim 8, wherein the patient parameter data indicative of chest collapse includes one or more of the age of the patient, the size of the patient, the gender of the patient, the presence of an implanted cardiac assist device in the patient, whether the patient is receiving ventilation therapy, and whether the patient is receiving defibrillation therapy.

15. The device of claim 8, wherein the processor is further configured to automatically determine whether the patient has a collapsed chest based on one or more of the rescuer input on chest collapse, one or more patient parameters indicative of chest collapse, or chest collapse data indicative of a change in the resting chest height of the patient over multiple chest compressions.

16. A cardio-pulmonary resuscitation (CPR) device, comprising:

a chest compression mechanism structured to administer chest compressions to a chest of a patient, the chest of the patient having a resting chest height;

a processor configured to:

determine a first zero-position and a maximum zero-position of the CPR device for at least one of the chest compressions to be administered to the chest of the patient, the maximum zero-position determined such that a minimum, non-zero chest compression depth is achieved;

determine a first chest compression depth of the chest compression mechanism;

detect a change in the resting chest height; and in response to the detected change in resting chest height while administering chest compressions to the chest of the patient, determine whether: a) to adjust a present zero-position and a compression depth or b) to maintain the present zero-position for a subsequent compression and, when so determined, automatically adjust the present zero-position of the CPR device to a position not greater than the maximum zero-position for the CPR device and administer chest compressions to the chest of the patient based on the adjusted zero-position.

17. The CPR device of 16, wherein the processor is further configured to determine whether chest compressions administered by the chest compression mechanism from the adjusted zero-position will exceed a threshold.

18. The CPR device of 16, wherein the processor is further configured to adjust the compression depth of the chest compression mechanism based on the detected change in resting chest height.

19. The CPR device of 16, wherein the processor is configured to detect a change in the resting chest height based on a value indicative of a force applied to the chest by the chest compression mechanism.

20. The CPR device of 16, wherein the processor is configured to detect a change in the resting chest height based on a value indicative of a pressure within a suction cup of the chest compression mechanism, the suction cup attached to the chest of the patient while the chest compression mechanism is administering chest compressions to the chest of the patient.

* * * * *